United States Patent [19]
Maroschak

[11] 3,941,639
[45] *Mar. 2, 1976

[54] TUBE DOFFING AND BUNDLING METHOD

[76] Inventor: Ernest J. Maroschak, Box 878, Roseboro, N.C. 28382

[*] Notice: The portion of the term of this patent subsequent to Mar. 11, 1992, has been disclaimed.

[22] Filed: May 29, 1973

[21] Appl. No.: 364,717

Related U.S. Application Data

[63] Continuation-in-part of Ser. No. 285,928, Sept. 1, 1972, Pat. No. 3,870,774.

[52] U.S. Cl. .................. 156/207; 100/6; 100/7; 156/244; 156/296; 214/6 D; 214/6 M; 264/40; 264/99; 264/150; 264/151; 264/209; 264/238; 264/DIG. 52; 425/135; 425/DIG. 231
[51] Int. Cl.² B29C 17/07; B29C 17/16; B65B 13/02
[58] Field of Search............ 264/40, 89, 90, 92–95, 264/98, 99, 148, 150, 151, 154, 156, 209, DIG. 52, 238; 425/142, 296, 135, 302, 303, 326, 342, 343, 396, 336, DIG. 203 C; 214/6 D, 6 M; 100/6, 7; 83/158–160; 156/207, 244, 296

[56] References Cited
UNITED STATES PATENTS

| | | | |
|---|---|---|---|
| 2,564,079 | 8/1951 | Rapp | 214/6 M UX |
| 3,106,315 | 10/1963 | Bailey | 214/6 M X |
| 3,127,829 | 4/1964 | Rossi | 100/7 X |
| 3,217,461 | 11/1965 | Wheelock | 214/6 D X |
| 3,286,305 | 11/1966 | Seckel | 425/378 X |
| 3,430,292 | 3/1969 | Bauman et al. | 425/183 |
| 3,751,541 | 8/1973 | Hegler | 264/150 X |

FOREIGN PATENTS OR APPLICATIONS

| | | | |
|---|---|---|---|
| 1,184,183 | 12/1964 | Germany | 83/158 |

*Primary Examiner*—Jan H. Silbaugh
*Attorney, Agent, or Firm*—Parrott, Bell, Seltzer, Park & Gibson

[57] ABSTRACT

Corrugated plastic tubes simultaneously feeding from a plurality of sources are doffed, stacked in nesting relation and formed into bundles of a predetermined number of tubes in accordance with the present invention. The corrugated plastic tubes are produced in continuous length in separate production lines, cut to predetermined lengths, and fed along predetermined paths to respective doffing stations where the tubes are doffed into a common hopper positioned adjacent the doffing stations. Upon a predetermined number of the tubes being doffed into the hopper and accumulated in stacked and nested relation, the tubes are advanced to a bundling station where strapping machines secure pliable strapping elements around the stacked and nested tubes to form the same into compact bundles. The bundles are then removed from the bundling station ready for shipment or storage.

12 Claims, 9 Drawing Figures

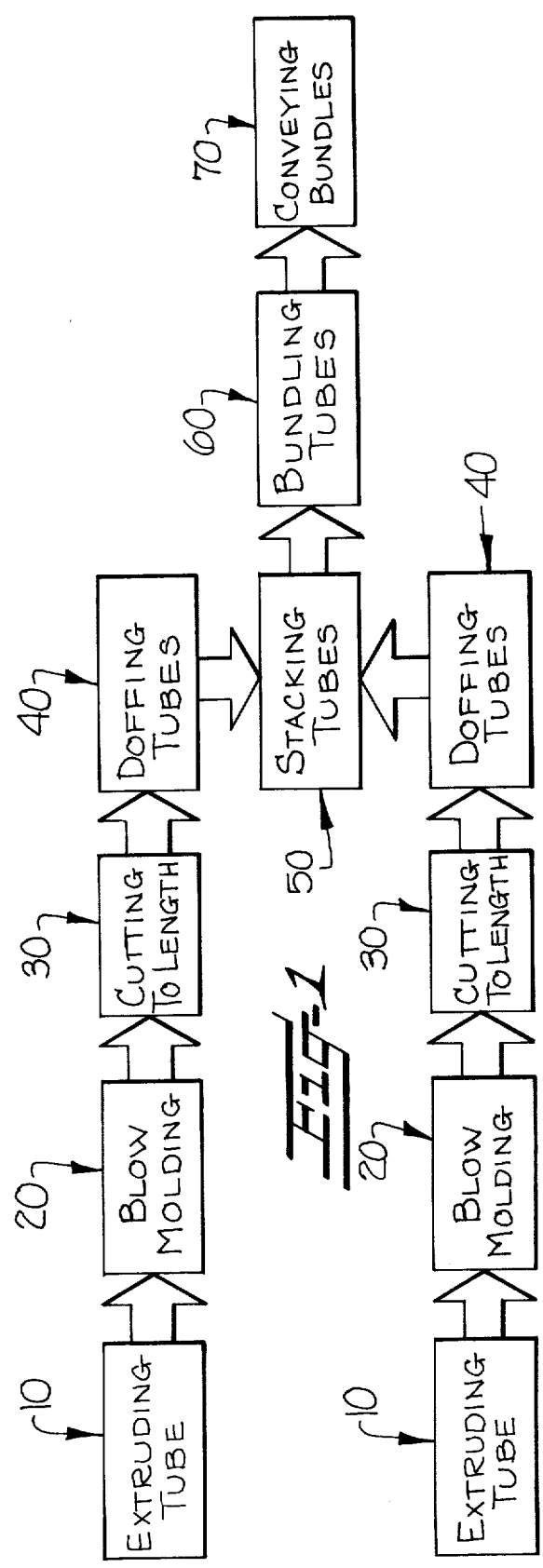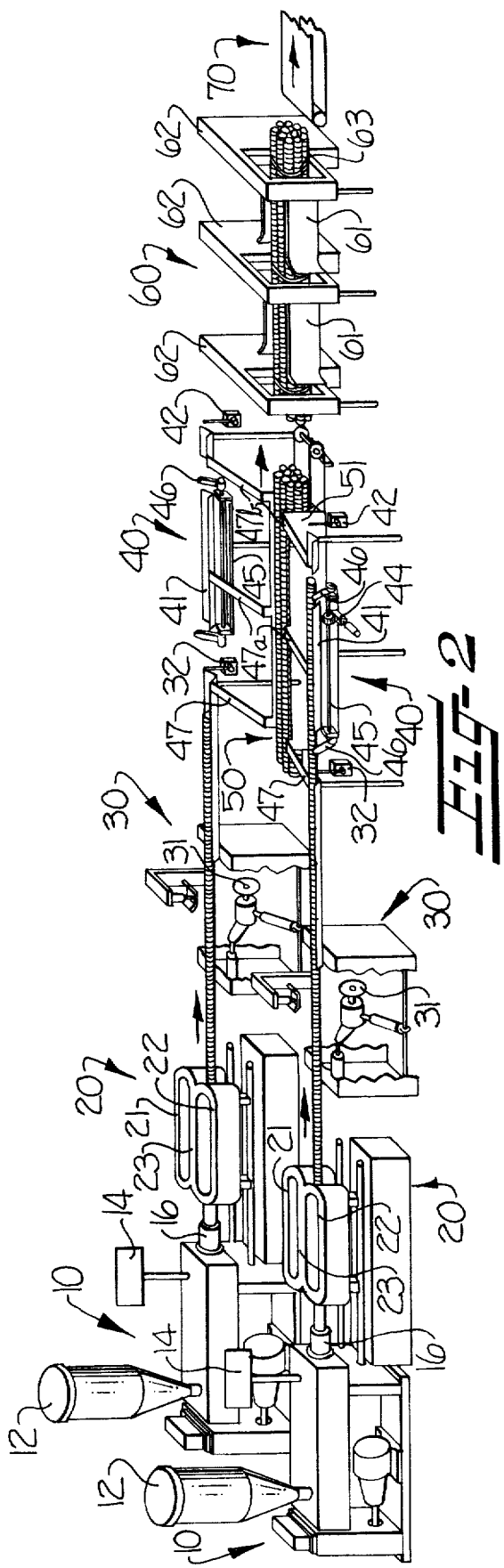

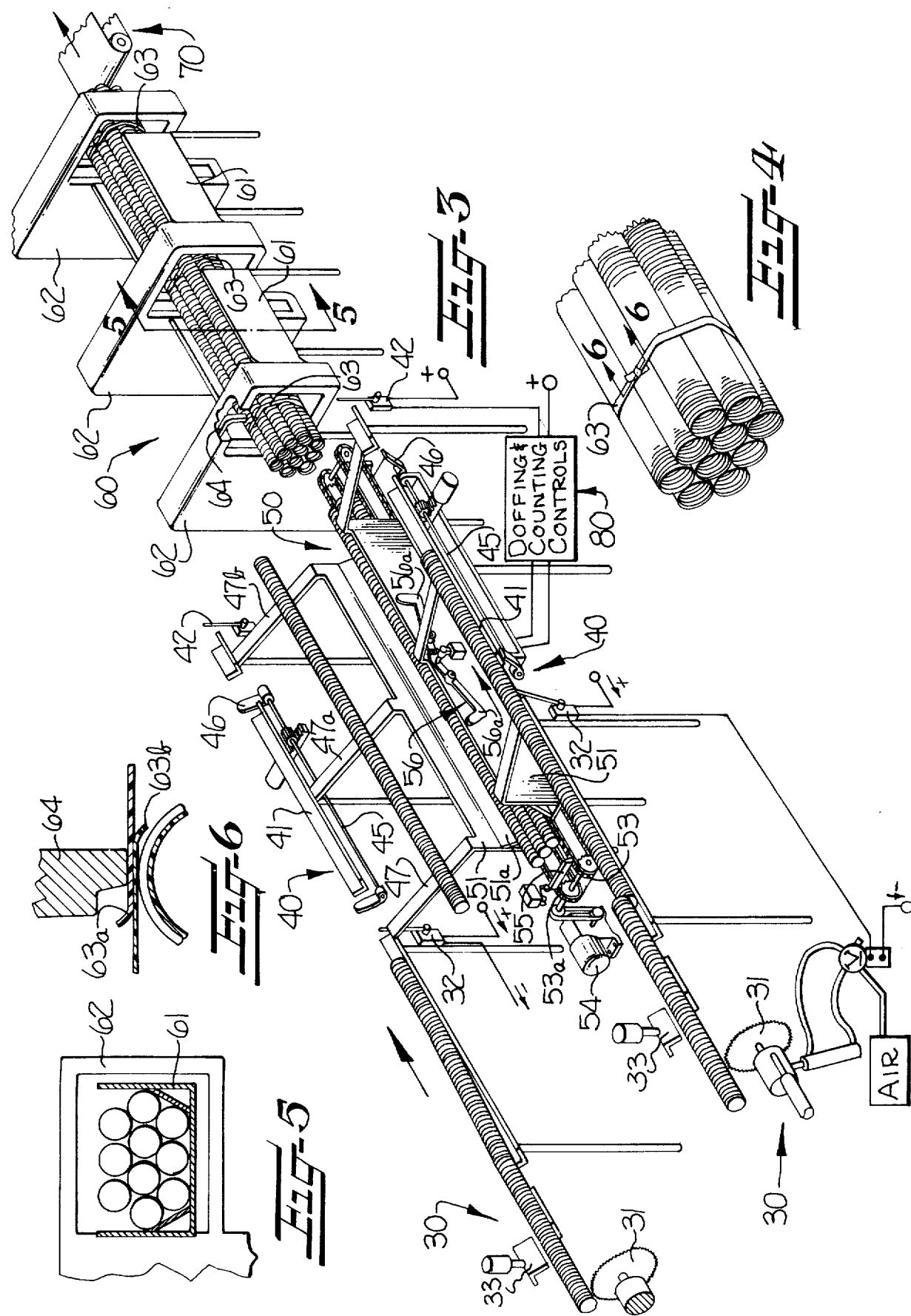

TUBE DOFFING AND BUNDLING METHOD

This application is a continuation-in-part of my copending application Ser. No. 285,928 filed Sept. 1, 1972, and entitled PIPE DOFFING AND BUNDLING METHOD now U.S. Pat. No. 3,870,774, issued Mar. 11, 1975.

The present invention relates to an improved method for forming lengths of tube, especially corrugated plastic tubes, into bundles containing a predetermined number of tubes in stacked and nested relation to facilitate shipment and handling.

Corrugated plastic tubing is conventionally formed in indefinite length by a continuous extrusion and blow molding operation. The tubing is ordinarily shipped to the consumer, however, either in rolls containing a predetermined number of linear feet or in bundles of cut lengths of tubes containing a predetermined linear footage. In order that the cut lengths of tubes may be easily handled and shipped, it is desirable that they be nested against each other and secured together to form a stable, compact bundle.

My aforementioned earlier filed copending application discloses a method and apparatus for doffing and bundling lengths of corrugated plastic tube wherein cut lengths of plastic tube feeding from a single production line are doffed according to a predetermined routine into either of two opposing hoppers positioned alongside the production line. After a predetermined number of the tubes have been accumulated in one hopper and stacked in nested relation, pliable binding elements may be secured around the tubes to form a bundle thereof. Since two hoppers are required for receiving the tubes produced by each blow molding tube production line, when several production lines are located in close proximity to each other a large amount of equipment, and consequently a considerable amount of floor space, is required for accumulating, stacking and bundling the tubes produced thereby.

With the foregoing in mind, it is a primary object of this invention to provide a method for forming bundles of stacked tubes at a common station for a plurality of blow molding tube production lines and which at times may be utilized with only one production line if so desired.

It is a more specific object of this invention to provide a method of forming plastic tubes into bundles by feeding a plurality of tubes longitudinally along respective predetermined paths of travel to respective cutting stations for forming successive tubes of predetermined length, directing successive cut tubes to respective doffing stations, doffing each successive tube from the respective doffing station into a common hopper positioned adjacent the doffing stations, accumulating and stacking the tubes doffed from the doffing stations in nesting relation in the hopper, and securing pliable binding elements around the stacked and nested tubes to form a bundle thereof.

My aforementioned earlier filed application provided apparatus for receiving successive tubes of predetermined length from a single blow molding tube production line and for accumulating and stacking the tubes in nested relation. However, it provided no apparatus for binding the stacked and nested tubes into bundles. With this in mind, it is a further apparatus object of this invention to provide apparatus for receiving tubes of predetermined length from a single tube production line or from a plurality of tube production lines, for accumulating the tubes in stacked and nested relation, and for securing pliable binding elements around the stacked and nested tubes to form bundles thereof.

Some of the objects of the invention having been stated, other objects will appear as the description proceeds when taken in connection with the accompanying drawings, in which FIG. 1 is a block diagram of the method of making corrugated plastic tubes, cutting the same to length, and forming the lengths into bundles of tubes;

FIG. 2 is a schematic perspective view of an arrangement of apparatus according to the present invention;

FIG. 3 is a more detailed schematic perspective view of the doffing, stacking and bundling apparatus according to the present invention;

FIG. 4 is a partial view of a plurality of tubes secured together by strapping material to form a bundle;

FIG. 5 is a vertical sectional view of a portion of the bundling apparatus of the present invention taken along the line 5—5 of FIG. 3;

FIG. 6 is a vertical sectional view taken along the line 6—6 in FIG. 4 showing the fused overlying end portions of the strapping material and additionally showing the fusing head employed for fusing the same;

Figure 7:
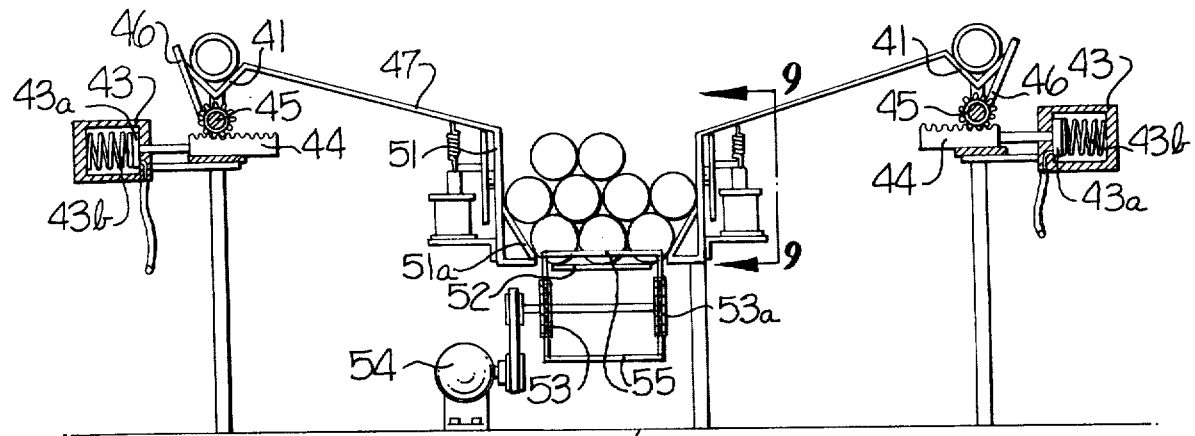
FIG. 7 is an end view of the doffing and stacking apparatus of FIG. 3.

Referring now more specifically to the drawings, as seen from FIGS. 1 and 2, corrugated plastic tubes are produced in two parallel production lines, each including an extruding station, a blow molding station, a cutting station and a doffing station. To avoid repetitive description only one production line will be described in detail and those parts shown in one production line which correspond to similar parts in the other line will bear the same reference characters.

The extruder, shown at 10, includes a hopper 12 for receiving plastic granules, a source 14 of pressurized air or other gas for the purposes hereinafter further described, and an extrusion die 16 for extruding a smooth tube of hot plastic material. An extruder of this type is well known in the art, and therefore a further more detailed description is not deemed necessary.

A blow molding apparatus 20 is positioned immediately adjacent the extruder 10 and is adapted to receive the extruded tube of hot plastic material therefrom and form annular corrugations thereon. The blow molding apparatus 20 includes two sets of cooperating substantially semitubular mold blocks arranged for successive movement along two opposed endless paths of travel 21, 22 such that cooperating pairs of the mold blocks define an elongate tubular blow molding zone 23. Each mold block has transverse semicircular internal alternating ribs and valleys with the ribs and valleys of one block of each pair cooperating with the ribs and valleys of the other mold block of the same pair to form annular ribs and valleys on the walls of the tubular mold cavity defined by the cooperating pair of mold blocks.

Pressurized air from source 14 communicates through the extrusion die 16 into the interior of the tube being extruded to expand and mold the same against the corrugated wall of the composite mold cavity formed by the abutting cooperating pairs of mold blocks in the blow molding zone 23.

The term "annular corrugations" as used herein means not only corrugations in the form of individual circular ribs and valleys around the plastic tube, but also includes spiral or helical ribs and valleys extending around and along the length of the corrugated tube. Also, some of the ribs of the corrugations may be interrupted at spaced intervals by plateaus which lie at a level intermediate the peripheries of the ribs and valleys of the corrugations, such as for the purpose of providing recesses in the corresponding ribs for the drilling of drainage holes through the recesses of the tubes.

The corrugated plastic tube is delivered from the blow molding apparatus 20 and is advanced to a cutting station 30 positioned forwardly of the blow molding apparatus. Although not specifically illustrated herein, each production line may also include an additional station located between blow molding apparatus 20 and cutting station 30 for the formation of perforations in the tube as it is advanced from the blow molding apparatus to the cutting station. As is well known, it is customary to provide round drainage holes in corrugated plastic tubes for use in septic tank fields or other drainage systems, and it is customary to provide circularly arranged series of arcuate slits, usually in alternate valleys, in a corrugated tube used for an underground irrigation system.

Referring now to cutting station 30, the motorized saw 31 thereof is actuated by a sensing switch 32 which is spaced a predetermined distance downstream from the motorized saw and is responsive to engagement thereof by the leading end of the molded tube. Thus, motorized saw 31, in cooperation with movable backup member 33 (FIG. 3), severs the tube into predetermined lengths as it moves forwardly through the cutting station 30. As is conventional, motorized saw 31 is reciprocated automatically to move forward with the tube during the cutting operation and, upon the cutting being completed, to return upstream to its original position ready for the next cutting operation.

After severing, the cut lengths of tube are advanced forwardly from cutting station 30 to a doffing station 40 positioned downstream and in alignment with the path of travel of the tube. Each successive cut length of tube is advanced into the doffing station by the leading end of the uncut tube pushing the trailing end of the previously severed length of tube. Each doffing station includes a horizontal supporting trough means 41 for supporting each successive length of tube in the doffing station and a doffing switch 42 positioned at the extreme downstream end of the doffing station adapted to be engaged by the leading end of each successive tube as the tube is fully received in the doffing station. Doffing switch 42 is connected through suitable doffing and counting controls 80, to be described later, to a cylinder or ram 43.

Cylinder 43 may be hydraulically or pneumatically operated and is spring loaded (FIG. 7) so as to remain in a predetermined position except when fluid pressure is applied thereto. Cylinder 43 is connected through a suitable rack and pinion arrangement 44 to a rocker shaft 45. Rocker shaft 45 is journaled in a position below and substantially parallel to supporting trough 41 and has a pair of upwardly extending doffer arms 46 located at opposite ends of the shaft. Switch 42 and doffing and counting controls 80 are so arranged that, as the leading end of each length of tube reaches the downstream end of the doffing station and engages switch 42, rocker shaft 45 is rotated so as to bring doffer arms 46 into engagement with the tube and eject the tube laterally from the supporting trough of the doffing station and into accumulating or stacking station 50.

As seen from FIG. 3, the two doffing stations 40 are positioned in opposed parallel relation with the accumulating or stacking station 50 being located between and at an elevation somewhat below the supporting trough means 41 of each doffing station. Angularly extending downwardly from each supporting trough 41 are three frame members 47, 47a, 47b forming a ramp for directing the ejected tubes laterally from the doffing station 40 to the stacking station 50.

Accumulating or stacking station 50 comprises a substantially U-shaped hopper for receiving the tubes, the sides of which are defined by opposing upright walls 51 which are spaced apart from each other a distance sufficient to accommodate four tubes in side-by-side relation. The distance across the bottom of the hopper is restricted to accommodate only three tubes in side-by-side relation. Gusset plates 51a are conveniently employed in the bottom corners of the U-shaped hopper to restrict the distance along the bottom of the hopper. A plate 52 (FIG. 7) defines the bottom of the hopper for supporting the tubes therein. Extending longitudinally along opposite sides of the bottom of the hopper and adjacent gusset plates 51a are a pair of endless conveyor chains 53, 53a, driven by suitable drive means such as an electric motor 54. Carried by chains 53, 53a and located approximately equal distances apart are a pair of horizontal flight bars 55 adapted for engaging the trailing ends of a plurality of the tubes in the hopper and pushing the stack of tubes from stacking station 50.

The hopper in stacking station 50 is constructed of such a shape that when 10 lengths of tube are doffed from the doffing stations and into the hopper, they will be arranged in a three layered stack having a bottom layer of three tubes in side-by-side relation, an intermediate layer of four tubes in side-by-side relation nestingly stacked on the bottom layer, and a top layer of three tubes also in side-by-side relation and nesting in the arcuate recesses formed by the intermediate layer of the tubes. When ten tubes have been accumulated in the hopper, as determined by the doffing and counting controls 80, the stack doffing operation is commenced in which conveyor chains 53, 53a and flight bars 55 are operated to move the stack of tubes forwardly from the stacking station to a bundling station 60 located downstream from the stacking station and in substantial alignment therewith. Flight bar 55 engages the trailing ends of at least some of the tubes in the stack and causes the entire stack to be pushed forwardly to the bundling station.

Figure 9:
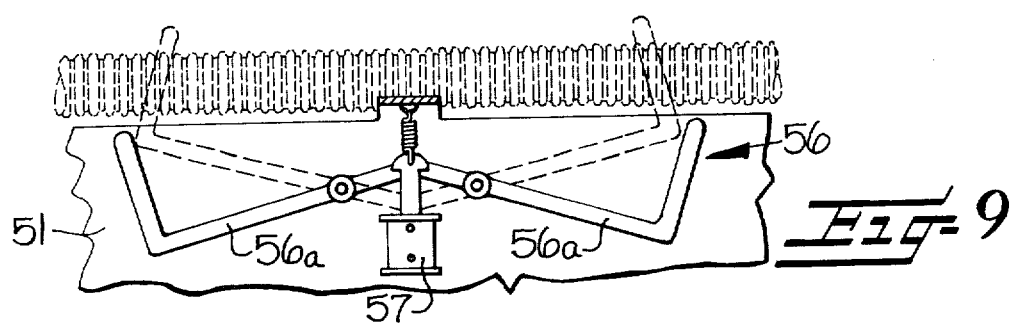
FIG. 9 is a detailed view of the gate means taken along the line 9—9 in FIG. 7.

While the stack of tubes is being advanced to the bundling station 60, each productionline is continually delivering tubes to the respective doffing stations. production line prevent additional tubes from being deposited in the hopper while the hopper is being emptied, a gate 56 is provided on each side of the hopper for holding back additional tubes which may be doffed during the stack doffing operation. Gate 56 includes a pair of movable stop arms 56a which, under control of the doffing and counting controls 80 to be described later, are raised after the 10th tube has been deposited in the hopper to obstruct the path of the ejected tubes, and are lowered again after the stack of tubes in the stacking station 50 has been advanced to the bundling station and the hopper is again ready to receive tubes. As seen most clearly in FIG. 9, stop arms 56a are generally L-shaped and are pivoted intermediate their opposite ends. A solenoid 57, connected to one end of each L-shaped stop arm 56a, is conveniently employed to raise the arms into operative position.

As the tubes are received in the bundling station, they are maintained in the desired stacked and nested relation by hoppers 61 which are of a cross section similar to the hopper in stacking station 50. As seen in FIG. 5, hoppers 61 are generally U-shaped and include vertical side walls, which are spaced apart a distance sufficient to accommodate four tubes in side-by-side relation, and a bottom, the distance across which is restricted to accommodate only three tubes in side-by-side relation. As in the stacking station, gusset plates are conveniently employed in the bottom corners of the hopper to restrict the distance along the bottom of the hopper.

Three automatic strapping machines 62 are employed for securing strapping material around the tubes at spaced locations along the length thereof to form a compact bundle of tubes. Strapping machines 62 automatically wrap strapping material 63 around the stack of tubes and secure the ends of the strapping material together. Machines of this general type are well known, and for this reason a further and more detailed description of the structure and operation of these machines is deemed unnecessary.

The strapping material 63 employed in automatic strapping machines 62 is preferably of the nonmetallic type. Fusible strapping material formed from thermoplastic materials such as nylon, polyester, or polyolefin may suitably be employed, with opposite ends 63a, 63b thereof being suitably fused together in overlying relation by a fusing head 64, which as shown in FIG. 6, may employ heat. However, the strapping material may be fused by other means, if desired, such as solvent or adhesive.

Alternatively, the stacked and nested tubes may be secured together manually at the bundling station with suitable twine or strapping material.

The thus formed bundle of tubes is removed from bundling station 60 when the subsequently formed stack of tubes is advanced from stacking station 50 to the bundling station. The leading ends of the tubes in the stacking station push against the trailing ends of the bundled tubes to push the bundle of tubes from the bundling station as the subsequent stack of tubes is being advanced into the bundling station.

Conveyor means 70, such as a conventional endless conveyor belt, is provided at the downstream end of the bundling station to receive the bundle of tubes from the bundling station and convey the same to suitable shipping or warehousing facilities.

Figure 8:
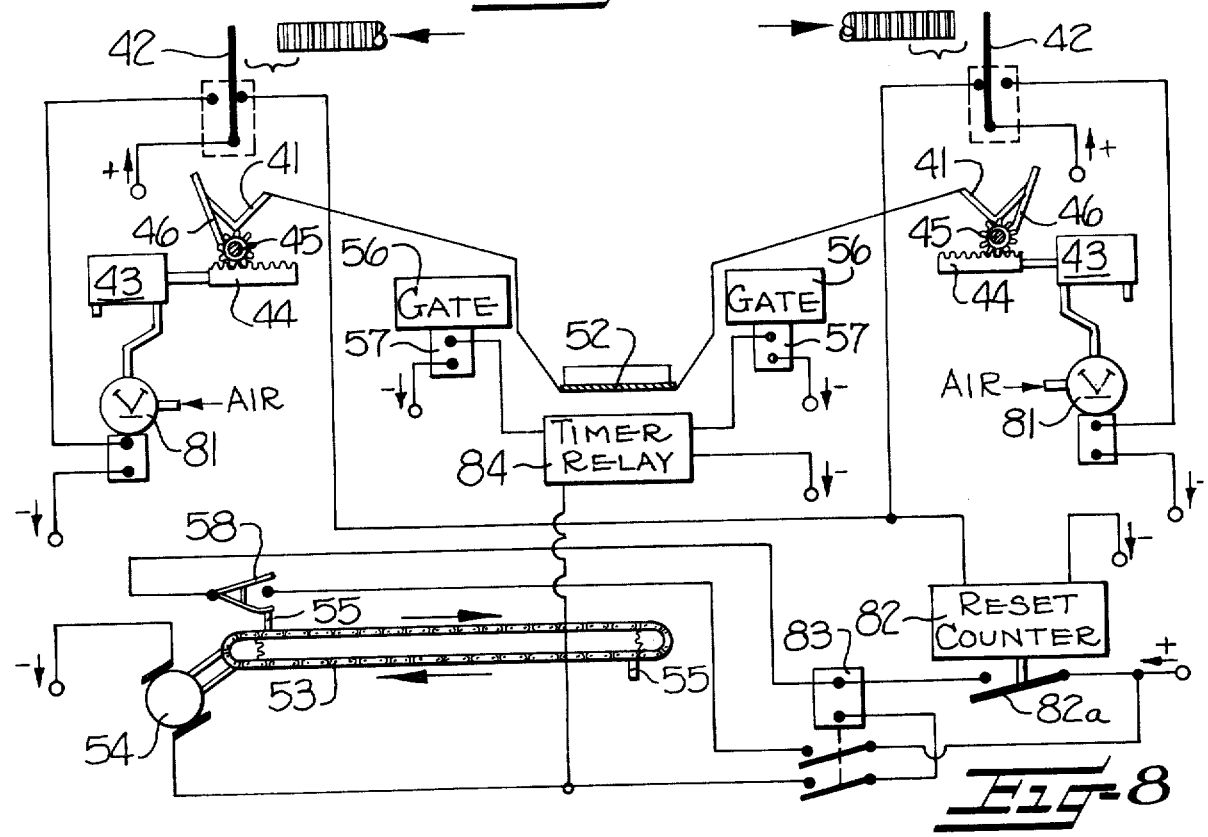
FIG. 8 is a schematic representation of the control system for doffing and counting.

FIG. 8 schematically shows the doffing and counting control system 80. Advancing tubes arriving at either of the doffing stations 40 close switch 42, located at the downstream end of each supporting trough 41, thereby opening air valve 81 and permitting compressed air or other fluid to flow into cylinder 43. Compressed air entering cylinder 43 drives piston 43a (FIG. 7) from its inactive position to which it is urged by spring 43b. The associated rack and pinion assembly 44 causes doffer arms 46 to rotate and thereby eject the tube from the doffing station.

Each time a tube is doffed from either of the two doffing stations, switch 42 operates a reset counter 82. Reset counter 82 is of a well-known type wherein contact 82a thereof is closed momentarily after the counter has been activated or interrupted a predetermined number of times. As employed in the circuit shown, contact 82a closes after a total of ten tubes have been doffed from the two doffing stations. The closing of contact 82a starts motor 54 of the conveyor mechanism. Thus, when ten tubes have been ejected into the hopper, flight bar 55 is driven forwardly to move the stack from stacking station 50 to the doffing station 60.

A holding circuit is provided to continue the operation of motor 54 until the stack of tubes has been removed from the hopper. According to the circuit shown, one cycle of the conveyor and flight bar mechanism is initiated by the momentary closing of contact 82a of reset counter 82. Sensing switch 58 is provided in the holding circuit to sense the presence of a flight bar at the upstream end of the hopper in stacking station 50. The holding circuit, also including relay 83 and sensing switch 58, keeps motor 54 in operation until the next successive flight bar arrives at the pretermined position below sensing switch 58. As shown in FIG. 3, sensing switch 58 is positioned upstream a short distance from the trailing end of the tubes in the hopper. Thus, flight bar 55, in its rest position, is also located upstream from the trailing ends of the tubes in the hopper and accordingly does not interfere with the stacking of the tubes in the hopper. This positioning of the flight bar also effects a short time delay to permit the tenth tube to be received and stacked in the hopper before flight bar 55 moves the stack of tubes from the hopper.

Time delay relay 84 is provided in the doffing and counting control system to delay for several seconds the closing of gate 56. Time delay relay 84 is of a conventional type wherein the contacts thereof close a predetermined length of time after the relay is energized, and open again immediately upon the relay being de-energized. This short delay afforded by this relay permits the tenth tube to be deposited into the hopper before the gate is closed. Time delay relay 84 is energized upon the starting of motor 54 and causes the contacts thereof to close several seconds after being energized.

The doffing, stacking and bundling mechanism of the present invention and the associated doffing and counting control system is designed to operate not only with two production lines, but also with a single production line in operation. Thus, the extruder, blow molding apparatus, and cutting station of one production line may be stopped to permit equipment maintenance or to accommodate production requirements without interfering with the stacking and bundling of tubes being produced in the other production line.

In the foregoing description the doffing, stacking and bundling operations according to the present invention have been shown as being performed simultaneously with the extrusion and blow molding of the corrugated plastic tubes. However, it should be apparent that the doffing, stacking and bundling apparatus of this invention is adaptable for being used, if desired, separately from the extruding and blow molding apparatus for converting previously formed tubes of indefinite length into bundles of nested tubes of predetermined length.

In the drawings and specification, there has been set forth a preferred embodiment of the invention and although specific terms are employed, they are used in a generic and descriptive sense only and not for purposes of limitation.

That which is claimed is:

1. A method of forming plastic tubes into bundles comprising feeding lines of successive tubes from a plurality of sources longitudinally along respective predetermined paths of travel to respective doffing stations, sensing the arrival of each successive tube in the respective doffing stations and in response thereto laterally ejecting the tubes from the respective doffing stations into a common hopper positioned adjacent the doffing stations, accumulating and stacking the tubes doffed from the doffing stations in nesting relation in the hopper, and securing pliable binding elements around the stacked and nested tubes to form a bundle thereof.

2. A method according to claim 1 which comprises the further step of moving the stacked and nested tubes from the hopper to a bundling station after a predetermined number of tubes have been accumulated and stacked in the hopper, said step of securing pliable binding elements around the tubes being performed at the bundling station after the stacked and nested tubes have been moved from the hopper thereto.

3. A method according to claim 2 comprising the further step of restraining additional tubes from being doffed into the hopper while the tubes accumulated in the hopper are being moved from the hopper to the bundling station.

4. A method according to claim 1 wherein the step of securing pliable binding elements around the stacked and nested tubes comprises positioning fusible plastic strapping material around the stacked and nested tubes at spaced locations along the length thereof with portions of the strapping material in overlying relation and fusing overlying portions of the strapping material together.

5. A method of forming bundles of plastic tubes, said method comprising continuously extruding a plurality of tubes of plastic material into respective blow molding zones while molding annular corrugations of alternating ribs and valleys on the tubes during the forward movement thereof through the respective blow molding zones, delivering the corrugated tubes from the respective blow molding zones, and advancing the tubes to respective cutting stations while successively cutting the tubes into separate tubes of predetermined length, advancing the cut tubes along respective predetermined paths of travel downstream from the respective cutting stations to respective doffing stations, sensing the arrival of each successive tube in the respective doffing stations and in response thereto laterally ejecting the tubes from the respective doffing stations into a common hopper positioned adjacent the doffing stations, accumulating and stacking the tubes doffed from the doffing stations in nesting relation in the hopper, and securing pliable binding elements around the stacked and nested tubes to form a bundle thereof.

6. A method according to claim 5 comprising the further step of moving the tubes from the hopper to a bundling station each time a predetermined number of tubes have been accumulated and stacked in the hopper, said step of securing pliable binding elements around the tubes being performed at the bundling station after the tubes have been moved from the hopper thereto.

7. A method according to claim 6 comprising the further step of restraining additional tubes from being doffed into the hopper while the tubes accumulated in the hopper are being moved from the hopper to the bundling station.

8. A method according to claim 5 wherein the step of advancing the cut tubes forwardly from the respective cutting stations to the respective doffing stations comprises pushing the trailing end of the previously cut tube with the leading end of the continuous uncut tube being received in the cutting station.

9. A method according to claim 5 wherein the step of securing pliable binding elements around the stacked and nested tubes comprises positioning fusible plastic strapping material around the stacked and nested tubes at spaced locations along the length thereof with portions of the strapping material in overlying relation and fusing overlying portions of the strapping material together.

10. A method of forming bundles of plastic tubes, said method comprising continuously extruding a tube of plastic material into a blow molding zone while molding annular corrugations of alternating ribs and valleys on the tube during the forward movement thereof through the blow molding zone, delivering the corrugated tube from the blow molding zone and advancing the tube through a cutting station while successively cutting the tube into separate tubes of predetermined length, feeding each successive tube along a path of travel downstream of the cutting station to a doffing station, and in response thereto doffing each successive tube from the doffing station into a hopper positioned adjacent the doffing station by engaging each tube intermediate its ends and quickly ejecting the same laterally from the doffing station, accumulating and stacking the tubes doffed from the doffing station in stacked and nested relation in the hopper, moving the stacked and nested tubes from the hopper to a bundling station each time a predetermined number of tubes have been accumulated and stacked in the hopper, and while at the bundling station securing pliable binding elements around the stacked and nested tubes to form a bundle of stacked and nested tubes.

11. A method according to claim 10 comprising the further step of restraining additional tubes from being doffed into the hopper while the tubes accumulated in the hopper are being moved from the hopper to the bundling station.

12. A method of forming bundles of plastic tubes, said method comprising continuously extruding a plurality of tubes of plastic material into respective blow molding zones while molding annular corrugations of alternating ribs and valleys on the tubes during the forward movement thereof through the respective blow molding zones, delivering the corrugated tubes from the respective blow molding zones and advancing the tubes to respective cutting stations while successively cutting the tubes into separate tubes of predetermined length, feeding the successive cut tubes along respective predetermined paths of travel downstream of the respective cutting stations to respective doffing stations by pushing the leading end of the advancing uncut tube against the trailing end of the previously cut tube, and in response to the arrival of each cut tube in the respective doffing station, laterally ejecting each successive tube from the respective doffing stations into a common hopper positioned adjacent the doffing stations, accumulating and stacking the tubes doffed from the doffing stations in nesting relation in the hopper, and securing pliable binding elements around the stacked and nested tubes to form a bundle thereof.

* * * * *

UNITED STATES PATENT AND TRADEMARK OFFICE
CERTIFICATE OF CORRECTION

PATENT NO. : 3,941,639
DATED : March 2, 1976
INVENTOR(S) : Ernest J. Maroschak

It is certified that error appears in the above--identified patent and that said Letters Patent are hereby corrected as shown below:

Column 4, Line 58, delete "pro-"; same column, Line 59, delete "duction line" and insert -- To --.

Signed and Sealed this eleventh Day of May 1976

[SEAL]

Attest:

RUTH C. MASON
Attesting Officer

C. MARSHALL DANN
Commissioner of Patents and Trademarks